Nov. 12, 1929.    O. WALLDEN    1,735,366
PISTON RING
Filed April 29, 1929
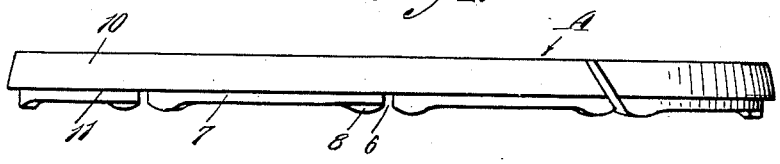
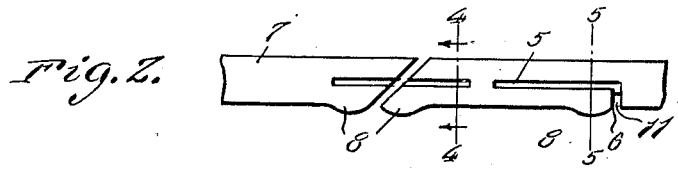
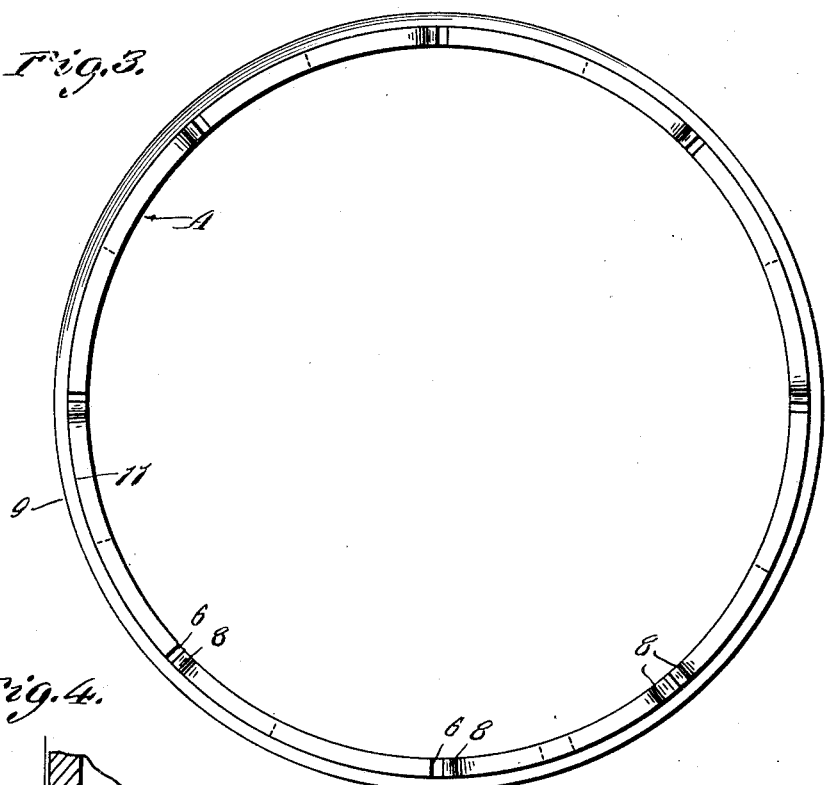
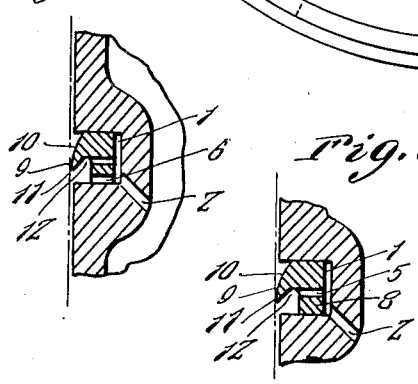
Inventor
Osborne Wallden
By Clarence A. O'Brien
Attorney Patented Nov. 12, 1929

1,735,366

UNITED STATES PATENT OFFICE

OSBORNE WALLDEN, OF EASTON, PENNSYLVANIA, ASSIGNOR OF ONE-HALF TO WILLIAM E. MATTHEWS, OF WASHINGTON, NEW JERSEY

PISTON RING

Application filed April 29, 1929. Serial No. 359,086.

This invention relates to a piston ring and more particularly to a wiping ring adapted to be associated with the piston in reciprocating engines of the trunk or cross head type, which will greatly reduce the operating cost of such engine in preventing excessive lubricating oil consumption and which will also prevent the lubricating oil from gaining access to the combustion space, thus preventing the accumulation of carbon, which as is well known very detrimental to the exhaust valve, since by the formation of carbon the exhaust becomes smoky and in general lowers the efficiency of the motor.

It has been repeatedly proven that an ordinary piston ring with high spring pressure will not stop the pumping. Also that a ring with too wide contact surface or without proper cutting edge has no value as an oil saver.

All rings have to be fitted loosely in their grooves so that they will not be sluggish. If a scraper ring should fit so close that the oil cannot go round, it would unquestionably have a higher friction in the groove than the spring tension of the ring could overcome.

Consequently then it would be valueless as an oil sealer, as the ring could not follow the wall on account of the piston side clearance.

Then too, it is necessary that the ring be so designed that it is held against its upper seat of the ring groove by some spring force. This spring force being strong enough to overcome the accelerating force of the ring but not strong enough to hinder the spring tension of the ring.

A ring which will fulfill the necessity as before pointed out and fully capable for the purpose designed is therefore the primary object of this invention and to this end the invention contemplates the provision of a ring, such as to be hereinafter described in detail and disclosed in the accompanying drawings, wherein:

Figure 1 is a side elevation of a ring constructed in accordance with my invention.

Figure 2 is a fragmentary detail sectional view thereof.

Figure 3 is a plan view of the ring.

Figure 4 is an enlarged section taken on the line 4—4 of Figure 2 and looking in the direction of the arrows.

Figure 5 is an enlarged section taken on the line 5—5 of Figure 2.

For the purpose of illustration, I have shown the ring of my invention in the accompanying drawings associated with the conventional piston, commonly used in reciprocating engines of the trunk or cross head type. As illustrated in Figures 4 and 5, the pistons in this type of engine having the wiper ring groove 1 provided on its face with a plurality of ducts 2, which extend from the outer face of the ring to the wall of the skirt into the interior thereof.

The present embodiment of my improved ring may be constructed of any suitable material and is preferably of the split ring type, and is represented generally by the reference character A. The ring is provided with a series of slots 5, extending through the ring from the outer to the inner surfaces. These slots extend circumferentially from the ring in spaced relation to each other and parallel with the upper and lower edges of the ring. Each of the grooves 5 terminate at one end in a laterally extending slot 6 extending through the ring from the outer to the inner surface to correspond with the slot 5, the slot 6 extending to the lower edge of the ring. The lower inner surface 7 of the ring is provided with the protuberances 8 under each free end of the slot. It is to be noted that the difference between the protuberances 8 is larger than any one ring groove, so that when the ring is inserted in the groove 1 of the piston, a spring effect is created forcing the ring against the upper surface of the ring groove.

This spring pressure shall be large enough to overcome the accelerating force of the ring and also effectively hold it against the upper surface to insure oil tightening. However, this spring pressure this way is not greater than the radial spring force and can overcome the friction and force the spring against the wall with the pressure desired. Also, in so forming the ring with the protuberances disposed as illustrated, there is provided a drain beneath the under surface of the ring 7 so that the ring has a spring forcing it up, thus eliminating a special groove for draining underneath the ring groove. It is well known that in using the scraping ring lubricating oil on the ring in too great a quantity has a tendency to gum up the ring or otherwise to make it sluggish when a little warm, thereby lowering the ring scraping efficiency more so on account of the rather small groove clearance than an ordinary ring has.

In the contemplated form of this invention the relief formed on the ring by means of the protuberances 8 is so ample that the oil has a free passage, and as the ring is forced against the upper surface of the groove by its spring action, there is no possibility of the oil gumming up the ring, or to impair its function.

As will be noted in Figures 4 and 5, the ring is provided with a relatively narrow bearing surface 9 and that portion of the ring above the bearing surface 9 is bevelled as at 10. The bearing surface 9 and the bevelled portion 10 has no scraping ability but instead form a very effective wedge enabling the ring to slide over the oil film on the up or out stroke of the piston.

The bearing portion 9 terminates at its lower edge into a substantially knife edge 11, which is formed by undercutting the portion 3 as shown at 12, thus forming a groove communicating with each of the slots 5, so that in operation it is obvious that the ring on the downward stroke of the piston by means of the knife-like edge 9 scrapes the oil from the cylinder wall, which oil then collects in the groove formed at 12, to be forced into the slots 5, to find an outlet in the slot 6 to finally drain through the board 2 formed in the skirt of the piston, since it is obvious that the oil collecting in that portion of the ring groove behind the piston ring will flow downwardly through the bore 2 and into the interior of the piston from whence it is drained back into the crank case. As before mentioned, in so providing the under surface of the ring with the protuberances 8, we also obtain a drain here so that the ring has a spring forcing it out, drained directly from the scraping edge, and a drain on the lower surface as before described, thus eliminating a special groove for draining underneath the ring groove.

Thus it will be seen that the construction as above described is very effective in preventing lubricant from passing by the ring to gain access to the combustion space, which, as known, is very detrimental and greatly lowers the efficiency of the motor.

It is also to be noted that the split of the ring passes through one of the slots 5, and that the ring adjacent its split end is also provided with the protuberances 8.

From the foregoing then, it will be seen that I have provided an improved scraper ring so constructed as to permit radial and lateral expansion of the ring, together with improved drain means whereby the oil scraped from the wall of the piston may be readily and quickly drained back into the crank case of the motor.

While I have herein shown and described the preferred embodiment of my invention, it is to be understood that certain changes may be made therein, fully comprehensive of the spirit of the invention as described and the scope of the appended claims.

Having thus described my invention, what I wish to claim is:

1. A piston ring provided on its outer periphery with a relatively narrow bearing surface, that portion of the outer periphery of the ring below the bearing surface being cut away to provide a relatively sharp wiping edge, which wiping edge is positioned above the plane of the lower edge of the ring whereby the said lower edge of the ring and undercut provides an annular oil receiving groove, a series of slots extending through the ring between the outer and inner surfaces thereof, and each of said slots at one end terminating in a laterally disposed slot extending from the first mentioned slot to the lower edge of said ring, said ring being provided on its bottom surface with a plurality of circumferentially spaced protuberances, there being one protuberance disposed adjacent each of said laterally disposed slots.

2. A piston ring provided on its outer periphery with a relatively narrow bearing surface, that portion of the outer periphery of the ring above the bearing surface bevelled to provide a surface sloping toward the cylinder walls, and that portion of the outer periphery of the ring below the bearing surface being cut away to provide a relatively sharp wiping edge, which wiping edge is provided above the plane of the lower edge of the ring, whereby the said lower edge of the ring and undercut provides an annular oil receiving groove, a series of elongated spaced slots extending circumferentially around the ring and parallel to the top and bottom surfaces of the ring, each of said slots having a laterally extending slot at one end thereof terminating flush with the lower surface of the ring, all of said slots extending through the ring from the outer to the inner surface thereof, and a plurality of spaced protuberances formed on the lower edge of said ring, there being one protuberance for each of said first mentioned slots and its corresponding lateral slot.

3. A piston ring provided on its outer periphery with a relatively narrow bearing surface, that portion of the outer periphery of the ring below the bearing surface being cut away to provide a relatively sharp wiping edge, a plurality of slots extending through the ring between the outer and inner surfaces thereof, and a plurality of spaced protuberances formed on the lower edge of said ring, there being one protuberance adjacent each of said slots.

4. A piston ring provided on its outer periphery with a relatively narrow bearing surface, that portion of the outer periphery of the ring below the bearing surface being cut away to provide a relatively sharp wiping edge, a plurality of circumferentially disposed spaced slots formed on the ring and extending therethrough from the outer to the inner surface, each of said slots terminating at one end thereof in a laterally extending slot terminating flush with the under surface of the ring, and protuberances formed on the lower edge of the ring, there being one protuberance adjacent each of said laterally extending slots.

5. The combination with a piston having an annular groove therein, of a piston ring inserted in said groove, said ring being provided on its outer periphery with a relatively narrow bearing surface, that portion of the outer periphery of the ring below the bearing surface being cut away to provide a relatively sharp wiping edge, said ring having a series of slots formed circumferentially thereon and extending from the outer to the inner surface of the ring, and a plurality of protuberances formed on the lower edge of the ring in spaced relation, the distance between the said protuberances being greater than the length of any one of said slots to permit radial and lateral expansion of the ring within the groove.

In testimony whereof I affix my signature.

OSBORNE WALLDEN.